United States Patent
Dhulipala

(10) Patent No.: US 10,430,320 B2
(45) Date of Patent: Oct. 1, 2019

(54) PRIORITIZATION OF TEST CASES

(71) Applicant: International Business Machines Corporation, Armonk, NY (US)

(72) Inventor: Krishna R. Dhulipala, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 14/856,600

(22) Filed: Sep. 17, 2015

(65) Prior Publication Data

US 2017/0083432 A1 Mar. 23, 2017

(51) Int. Cl.
*G06F 19/00* (2018.01)
*G06F 11/36* (2006.01)

(52) U.S. Cl.
CPC .................. *G06F 11/3684* (2013.01)

(58) Field of Classification Search
CPC ............. G06F 11/3688; G06F 11/3684; G06F 11/3676; G06F 11/3664; G06F 8/70; G06F 11/3692; G06F 11/368; G06F 11/3672; G06F 11/3612; G06F 8/30; G06F 11/28; G06F 11/3608; G06F 11/3668; G06F 3/04842
See application file for complete search history.

(56) References Cited

U.S. PATENT DOCUMENTS

| | | | |
|---|---|---|---|
| 7,028,290 B2 | 4/2006 | Srivastava et al. | |
| 7,552,361 B2 | 6/2009 | Galler et al. | |
| 7,840,844 B2 | 11/2010 | Garland et al. | |
| 8,352,904 B2 | 1/2013 | Hodges | |
| 8,527,813 B2 | 9/2013 | Budnik et al. | |
| 2009/0265681 A1 | 10/2009 | Beto et al. | |
| 2009/0265693 A1 | 10/2009 | Bakowski | |
| 2011/0099439 A1* | 4/2011 | Brewerton | G06F 11/3604 714/724 |
| 2012/0173187 A1* | 7/2012 | Lee | G06F 11/3414 702/123 |

(Continued)

FOREIGN PATENT DOCUMENTS

CN 101908020 A 12/2010

OTHER PUBLICATIONS

Jatain, et al., "A Systematic Review of Techniques for Test Case Prioritization", International Journal of Computer Applications (0975-8887), vol. 68—No. 2, Apr. 2013, pp. 38-42.

(Continued)

*Primary Examiner* — Roy Y Yi
(74) *Attorney, Agent, or Firm* — Christopher K. McLane; Daniel R. Simek

(57) ABSTRACT

The method includes identifying, by one or more computer processors, elements of a test case, wherein elements include components that provide parameters of the test case. The method further includes assigning, by one or more computer processors, a score for each component of the one or more identified elements. The method further includes determining, by one or more computer processors, a priority score for each of the one or more test cases based upon the assigned score for each component of the one or more identified elements, wherein the priority score is a representation of a measure of importance for each one of the one or more tests case by a user.

18 Claims, 4 Drawing Sheets

(56) References Cited

U.S. PATENT DOCUMENTS

| | | | |
|---|---|---|---|
| 2013/0061209 A1* | 3/2013 | Lam | G06F 11/3672 717/123 |
| 2013/0159774 A1* | 6/2013 | Budnik | G06F 11/3688 714/33 |
| 2014/0380279 A1 | 12/2014 | Bartley et al. | |
| 2015/0261657 A1* | 9/2015 | Kommineni | G06F 11/3676 714/38.1 |
| 2016/0117239 A1* | 4/2016 | Hamilton, II | G06F 11/3684 717/124 |

OTHER PUBLICATIONS

Jeffrey, et al., "Test Case Prioritization Using Relevant Slices", Proceedings of the 30th Annual International Computer Software and Applications Conference (COMPSAC'06), © 2006 IEEE, 8 pages, printed Apr. 7, 2015.

Kheirkhah, et al., "Prioritization of Unit Testing on Non-Object Oriented Using a Top-Down Based Approach", 2014 8th Malaysian Software Engineering Conference (MySEC), © 2014 IEEE, pp. 72-77, printed Apr. 7, 2015.

Roongruangsuwan, et al., "Test Case Prioritization Techniques", Journal of Theoretical and Applied Information Technology, © 2005-2010 JATIT & LLS, pp. 45-60, vol. 18, No. 2, printed Apr. 7, 2015, <www.jatit.org>.

Rothermel, et al., "Prioritizing Test Cases for Regression Testing", IEEE Transactions on Software Engineering, vol. 27, No. 10, Oct. 1, 2001, © 2001 IEEE, accepted Aug. 21, 2000, 21 pages.

Srikanth, et al., "On the Economics of Requirements-Based Test Case Prioritization", EDSER'05, May 15, 2005, Copyright 2005 ACM, 3 pages.

Srikanth, et al., "Requirements-Based Test Case Prioritization", North Carolina State University, ACM SIGSOFT Software Engineering, 2 pages, 2005.

Srikanth, et al., "Towards the prioritization of system test cases", Software Testing, Verification and Reliability, 2014, Published online Jun. 5, 2013, Copyright 2013 John Wiley & Sons Ltd., 18 pages.

Global Outsourced Software Testing Services Market 2014-2018, Jul. 2014, Infiniti Research Limited, 3 pages.

"Mechanism and Algorithm for Optimizing Test Case Execution Using Historical Data", An IP.com Prior Art Database Technical Disclosure, IP.com No. 000198310, Publication Date: Aug. 4, 2010, pp. 1-5.

"System and Method to Generate and Prioritize Test Cases", An IP.com Prior Art Database Technical Disclosure, IP.com No. 000221075, Publication Date: Aug. 28, 2012, pp. 1-10.

* cited by examiner

FIG. 3
$$\begin{cases} (ReqtComp_{r \times c})^T = CompReqt_{c \times r} \\ CompReqt_{c \times r} \times Redt_{r \times 1} = Compreqtscore_{c \times 1} \end{cases}$$

FIG. 4
$$\begin{cases} (JustfixeddefectComp_{j \times c})^T = CompJustfixeddefect_{c \times j} \\ CompJustfixeddefect_{c \times j} \times 1_{r \times 1} = CompJustfixeddefectscore_{c \times 1} \end{cases}$$

FIG. 5
$$\begin{cases} (PastdefectComp_{p \times c})^T = CompPastdefectdefect_{c \times p} \\ CompPastdefect_{c \times p} \times 1_{p \times 1} = CompPastdefectscore_{c \times 1} \end{cases}$$

$$[Comppreqtscore_{c \times 1} \; CompJustfixeddefectscore_{c \times 1} \; CompPastdefectscore_{c \times 1}]_{c \times 3} = Componentscores_{c \times 3}$$

FIG. 6

FIG. 7
$$\begin{cases} TestCaseComp_{t \times c} = Testcase\;Reqt_{t \times r} \times ReqtComp_{r \times c} \\ Testcaserawscores_{t \times 3} = TestcaseComp_{t \times c} = Componentscores_{c \times 3} \\ Testcaseweightedscores_{t \times 1} = Testcaserawscores_{t \times 3} \times Weightages_{3 \times 1} \end{cases}$$

PRIORITIZATION OF TEST CASES

BACKGROUND

The present invention relates generally to test cases, and more particularly to prioritizing test cases.

A test case, in software engineering, is a set of conditions under which a tester will determine whether an application, software system, or one of its features is working as it was originally established for it to do. Many test cases may be needed to determine that a software program or system is considered sufficiently scrutinized to be released.

In order to fully test that all the requirements of an application are met, there must be at least two test cases for each requirement: one positive test and one negative test. If a requirement has sub-requirements, then each sub-requirement must have at least two test cases. Keeping track of the link between the requirement and the test is frequently done using a traceability matrix. Written test cases should include a description of the functionality to be tested, and the preparation required to ensure that the test can be conducted.

SUMMARY

Embodiments of the present invention disclose a method, computer program product, and system for determining priority information for test cases. In one embodiment, in accordance with the present invention, the computer-implemented method includes identifying, by one or more computer processors, elements of a test case, wherein elements include components that provide parameters of the test case. The method further includes assigning, by one or more computer processors, a score for each component of the one or more identified elements. The method further includes determining, by one or more computer processors, a priority score for each of the one or more test cases based upon the assigned score for each component of the one or more identified elements, wherein the priority score is a representation of a measure of importance for each one of the one or more tests case by a user.

BRIEF DESCRIPTION OF THE DRAWINGS

FIG. 3 depicts an equation for mapping requirements to components representing a matrix, having dimensions r by c.

FIG. 4 depicts an equation for mapping recent defects to components representing a matrix, having dimensions j by c.

FIG. 5 depicts an equation for mapping past defects to components representing a matrix, having dimensions p by c.

FIG. 6 depicts an equation for component scores based upon the equations of mapping requirements, recent defects, and past defects.

FIG. 7 depicts an equation for creating weighted scores for test cases based upon weightages and test cases cores.

DETAILED DESCRIPTION

Embodiments of the present invention recognize that current methods for the prioritization of test cases for faster detection of software defects rely on fine grained code level analysis of the application during testing. Further embodiments of the invention recognize that current methods for prioritization of test cases rely on subjective evaluations of implementation complexity. Embodiments of the present invention also recognize the need for continuous prioritization of test cases based on the ongoing execution of test cases.

Figure 1:
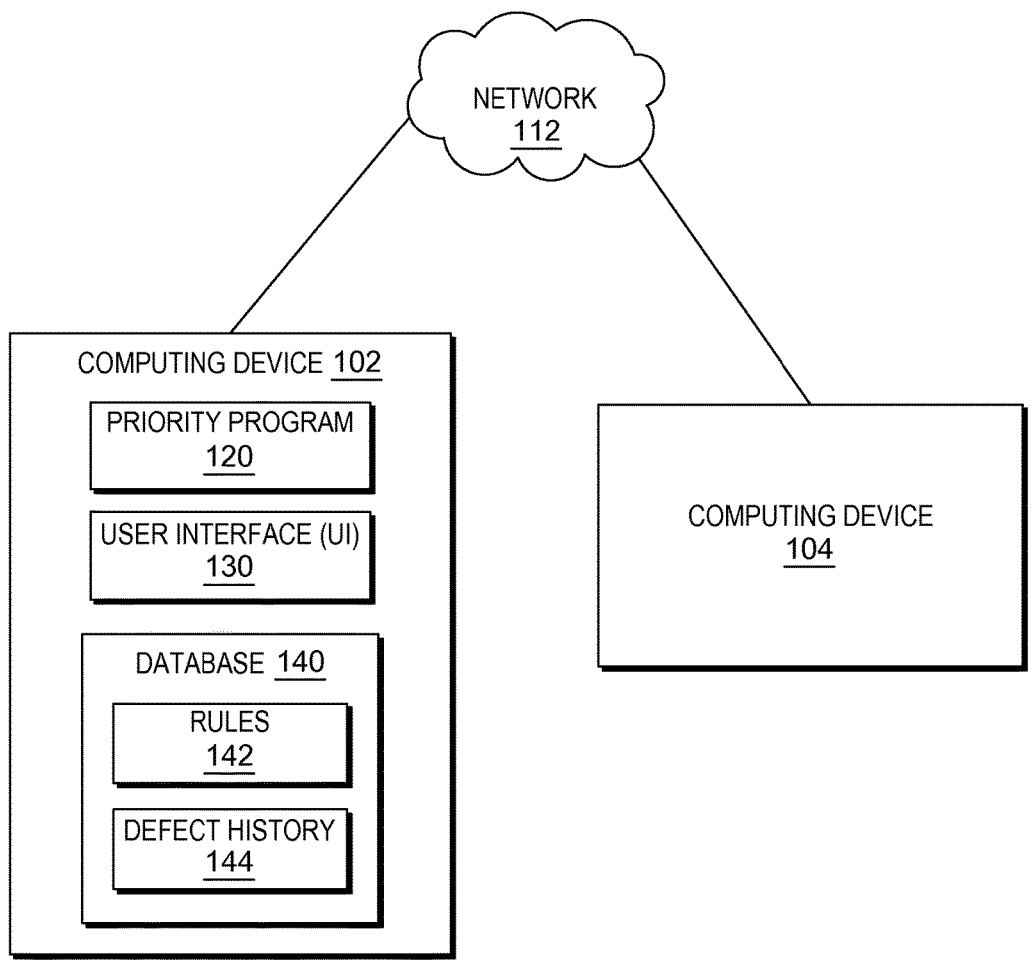
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 102 and computing device 104, interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, computing device 102 is one or more of a management server, a web server, or any other electronic device or computing system capable of receiving, analyzing, and sending data. In the depicted embodiment, computing device 102 hosts priority program 120, which prioritizes test cases. In other embodiments, computing device 102 represents a server computing system utilizing multiple computers as a server system, such as in a cloud computing environment. In another embodiment, computing device 102 represents a laptop computer, a tablet computer, a netbook computer, a personal computer (PC), a desktop computer, a personal digital assistant (PDA), a smart phone, or any programmable electronic device capable of communicating with network 112. In another embodiment, computing device 102 represents a computing system utilizing clustered computers and components to act as a single pool of seamless resources. Computing device 102 may include components, as depicted and described in further detail with respect to FIG. 8, in accordance with embodiments of the present invention. Computing device 102 includes priority program 120, user interface (UI) 130, and database 140.

In depicted distributed data processing environment 100, priority program 120 resides on computing device 102 and prioritizes test cases. In various embodiments, priority program 120 may be accessed by another computing device (e.g., computing device 104), or a plurality of client devices (not depicted) via network 112. In some embodiments, priority program 120 may reside on another computing device and operate as an independent standalone program with access to database 140 via network 112. In an embodiment, priority program 120 may receive data about test cases (e.g., metadata), components, requirements, user created ratings based on the severity of errors related to a specific component as determined by a user, historical data related to previous errors a specific component had, etc. Some examples of metadata may include: requirement names, requirement importance to a component, component name, requirement to component mapping (i.e., which requirements belong to which components), test case name, test case to component mapping (i.e., which components belong to which test cases), defect name, severity of defects, components to defect mapping (i.e., which defects belong to which components). In some embodiments, priority program 120 may receive data from a user of another computing device (e.g., computing device 104), a user of computing device 102 via a user interface (UI) (e.g., UI 130), or from multiple other computing devices (not depicted). In another embodiment, priority program 120 may access database 140 to identify stored data related to test cases, components, requirements, etc. Priority program 120 is depicted and described in further detail with respect to FIG. 2.

In depicted distributed data processing environment 100, user interface (UI) 130 resides on computing device 102. In other embodiments, UI 130 may reside on another computing device (not depicted) capable of communicating with computing device 102 via network 112. UI 130 is a computer program that provides an interface between a user and priority program 120. A user interface refers to the information, such as graphic, text, and sound, a program presents to a user, and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In the depicted embodiment, computing device 104 is one or more of a desktop computer, a laptop computer, a tablet computer, a specialized computer server, a smart phone, or any programmable electronic device capable of communicating with computing device 102 via network 112, and with various components and devices within distributed data processing environment 100. In general, computing device 104 represents any programmable electronic device or combination of programmable electronic devices capable of executing machine readable program instructions and communicating with other computing devices via a network, such as network 112. In various embodiments, computing device 104 may send and receive information from priority program 120 or database 140 via network 112. Computing device 104 may include components described in further detail with respect to FIG. 8, in accordance with embodiments of the present invention.

In one example, computing device 104 may be utilized by systems engineers/business analysts collecting requirements, and optionally, prioritize the requirements based on importance to the business during the initial stages of a project. Additionally, architects may design the system that implements the requirements. Architects may identify and describe the architectural components (hereafter called "components") that the system utilizes to operate. Architects may map components to the requirements that are implemented by the components. In another embodiment, the mapping may take place on computing device 102 via UI 130.

In another example, test planners can utilize computing device 104 to design test cases that test the requirements. Test planners, possibly partnering with systems engineers, identify the test cases and corresponding requirements. In another embodiment, actions may take place on computing device 102 via UI 130.

In another example, users/testers can utilize computing device 104 to execute a test case to uncover defects. In some examples, unless a defect is not clearly code related, defects are sent to the developers who assess if the defect is due to defects in the code. Users/testers may also assign a severity level for each defect located (e.g., Severity 1 through Severity 5). In another embodiment, actions may take place on computing device 102 via UI 130.

In yet another example, users/developers work on identified defects, fix the necessary code, and check in the fixed code. The user/developers know which components have been modified based on specific defects and can map the defects to the components. In another embodiment, these actions may take place on computing device 102 via UI 130.

In the depicted embodiment, database 140 resides on computing device 102. In another embodiment, database 140 may reside elsewhere in distributed data processing environment 100, such as within one or more additional computing devices (e.g., computing device 104) or independently as a standalone database that is capable of communicating with priority program 120 via network 112. Database 140 is implemented with any type of storage device capable of storing data that is accessed and utilized by computing device 102, such as a database server, a hard disk drive, or a flash memory. In other embodiments, database 140 represents multiple storage devices within computing device 102. Database 140 stores information regarding test cases, components, requirements, test case history (e.g., defects), etc. In an example, database 140 stores rules 142 and defect history 144 that may be stored by a user of priority program 120 dictating how to weight components, requirements, past defects, etc. Database 140 includes rules 142 and defect history 144.

Requirements are generally smaller subunits of a component utilized in a test case. Multiple requirements may make up a component as well as overlap in various components. Some examples of requirements may include: the system shall manage small and large customers; the system shall allow multiple accounts for a large customer; the system shall manage long-standing contracts between customers and business units; the system shall present available products to customers, price the products, and capture orders from customers; the system shall price customer orders based on price catalogs tied to sales channels and customer contracts; the customer orders shall show contain product, pricing, and tax information; the system shall be able to bill the customer account for one-time and recurring charges; the system shall have the capability to log changes to a list of business object types specified by administrative users; the customers shall be able to contact customer service about their purchases through phone, web, and mobile channels; the product management team shall be able to manage product catalog and price lists; etc.

Architectural components, "components," are utilized by the system to operate and are overarching parameters for a test case. Some examples of components may include: contacts management, customer management, account management, order management, product management, pricing, call management, service request management, taxation, authentication, authorization, logging, dashboard, forecasting, etc.

Some examples of test cases may include: creating two accounts for a customer with type="Large;" creating a service request for a small customer as a result of a phone call from the customer; creating a long-standing contract between the hardware business unit and large customer; setting the price list eligibility to "Preferred;" creating an order for an account of a customer with a long-standing contract with the price list eligibility of "preferred," and the prices shown should be from the "preferred" price list.

In the depicted embodiment, rules 142 resides in database 140. Rules 142 may include one or more of preset rules from a user. In an example, rules 142 may contain information regarding the amount of time to wait between resorting of test cases based on priority. In another example, rules 142 may contain sorting algorithms. In some embodiments, rules 142 may be stored by a user of computing device 102, computing device 104, or another computing device not depicted.

In the depicted embodiments, defect history 144 resides in database 140. Defect history 144 may contain past defects related to components. In an example, defect history 144 may result in a score that is associated with defect histories of components being computed, which indicates the severity of a defect as determined by a user. In one embodiments the score that is associated with defect history 144 may be assigned by the priority program 120 based upon the severity of the defect. In another embodiment, priority program 120 may assign a score based upon the time lapsed since the defect was recorded.

Figure 2:
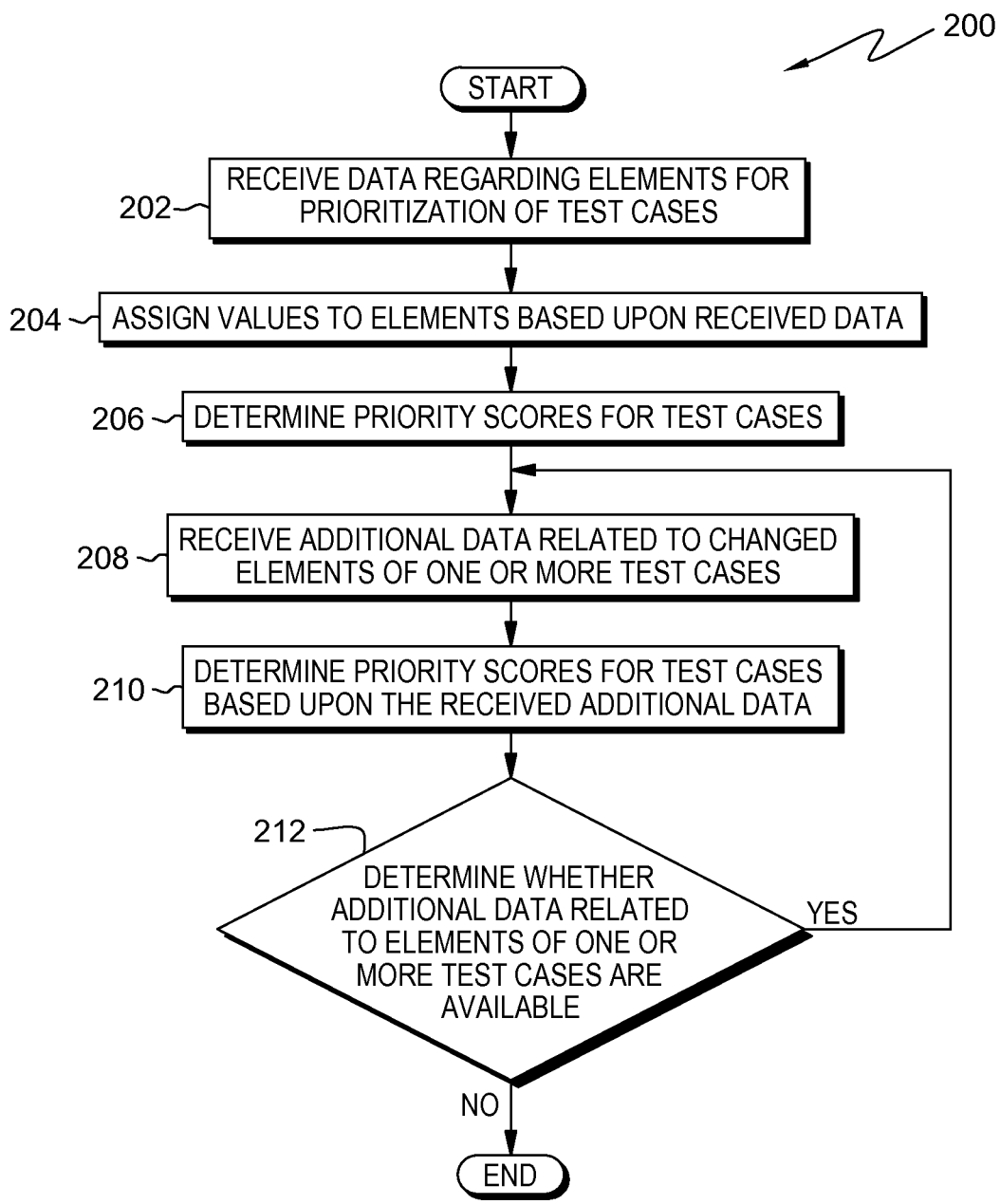
FIG. 2 is a flowchart depicting operational steps of a program for prioritizing test cases within the distributed data processing environment of FIG. 1, in accordance with an embodiment of the present invention.

FIG. 2 is a flowchart depicting operational steps of program 200, which is a function of priority program 120, in accordance with an embodiment of the present invention. Program 200 operates on computing device 102 and prioritizes test cases. In various embodiments, program 200 may determine the priority of test cases based upon received data from another computing device (e.g., computing device 104). In one embodiment, an administrator initiates the operational steps of program 200 to prioritize test cases. In another embodiment, priority program 120 may initiate the operational steps of program 200 in response to receiving or storing new data, such as recently fixed defects. In yet another embodiment, the operational steps of program 200 may initiate at preset time intervals.

Program 200 receives data regarding elements for prioritization of test cases (step 202). In various embodiments, program 200 receives data regarding elements (e.g., test cases, components, requirements, defect history, etc.) from one or more other computing devices (e.g., computing device 104). In some embodiments, program 200 may identify data regarding elements of test case prioritization located in a database (e.g., database 140). In some embodiments, program 200 may receive data directly from a user of program 200 via a UI, such as UI 130. In an example, program 200 may have a prompt requesting data pertaining to specific elements, such as the number of requirements for a specific component (e.g., 25 requirements for component 1) if the data is not already accessible.

In some examples, program 200 may also receive some values, also known as scores, associated with the received elements. A user of program 200 might receive a value for the severity of a defect previously discovered in a test case. For example, a past defect is known to have an error in component number 8, 11, and 13. Based upon the severity of the error in each component, a user might have assigned, at the time of checking in fixed code, a value to each component regarding the specific defect ranging from 1-10 with the highest severity being 10 and lowest severity being 1, or another scale that the user defines (e.g., defect 10 has a score of 4 for component 8, a score of 6 for component 11, and a score of 8 for component 13). In another example, program 200 may receive assigned values of equal value for the severity of a defect for all of the fixed components.

In various embodiments, program 200 may receive or identify user-created rules used to determine the priority of test cases. In some examples, the rules received may include algorithms for performing determinations of priority, spreadsheets with user-created functions for determining priority, etc. In other examples, the rules received may include weightages for the complexity due to requirements supported by a component, defect history of a component, and untested defects for a components.

Program 200 assigns values to elements based upon received data (step 204). In various embodiments, program 200 assigns values to received elements (e.g., requirements importance, components importance, and defects importance). For example, program 200 may assign a value for a component based upon the complexity of the component (e.g., how many requirements and/or importance of the requirements). In some examples, requirements may be assigned values based upon the amount of requirements that make up a given component. In other examples, all requirements may be given the same importance value, and corresponding components may be assigned values based upon the number of requirements each component contains (e.g., component 1 contains 10 requirements; therefore, component 1 receives a score of 4 on a scale of 1-10; component 2 contains 30 requirements; therefore, component 2 receives a score of 8).

In some embodiments, a user of program 200 may assign values to requirements based upon the deemed importance of each requirement. In some embodiments, a user of program 200 may also assign values to components and/or defects based upon the deemed importance and/or severity. In multiple embodiments, requirements may overlap between components and test cases. For example, a singular test case may have components number 1-10, wherein each component contains various requirements numbered 1-50. Requirement number 5 may be associated with component 2, 3, and 8. Component 3 may be associated with test case 1 and 7.

In various embodiments, program 200 assigns a higher value for defects that are yet to be tested or resolved, which causes the final priority score to increase. In an example, the increase in score means that the test case will be given higher priority to resolve the errors. In other embodiments, a user may preset program 200 to generate lower values for defects that are yet to be tested or resolved. In an example in which a defect contains multiple errors, program 200 may also assign a higher score. The defect may affect the score for multiple test cases as the requirement or component may be associated with multiple test cases. In some examples, program 200 may receive data indicating that a defect has been fixed, in which case program 200 assigns a low score to the defect.

Program 200 determines priority scores for test cases (step 206). Program 200 determines priority test scores for the one or more received test cases based upon the received elements for each test case. In some embodiments, program 200 may assign a score for the components that are based on requirements scores, such as input A (e.g., requirements versus component mapping). Program 200 may assign a score for the components that are based on past defects, such as input B (e.g., past defects versus components mapping). Program 200 may assign a score to test cases based on components that support a test case and the assigned score of the components, such as input C (requirements versus test case mapping). Program 200 can utilize inputs A, B, and C to calculate a priority score for each test case. In some embodiments, the inputs are weighted based on preset rules received by a user or priority program 120, which allows a user of priority program 120 to determine which values should hold more weight. In an example, the max value for a test case priority score may be 100. If input A received a score of 40, input B received a score of 50, and input C received a score of 60, then program 200 utilizes preset rules to scale the score on a 1-100 scale. Program 200 may weight inputs A, B, and C on a 20%, 60%, 20% scale respectively.

In an embodiment, program 200 may determine priority scores for test cases by utilizing equations and matrixes. In an example, program 200 utilizes equations depicted in FIGS. 3 and 5 to create values for components as related to requirements and past defects.

FIG. 3 depicts an equation for determining the complexity of a component based upon how important the requirements are that support the component. In FIG. 3, ReqtComp represents a matrix that maps requirements to components, which are produced as part of architecting a system. ReqtComp has dimensions r by c. The dimension r represents a requirement. The list of requirements is denoted by matrix Reqt having the dimensions r by 1. The dimension c represents components, which are produced as part of architecting a system based upon the requirements. In FIG. 3, ReqtComp is transposed, represented by T to create CompReqt with dimensions c by r. CompReqt is then multiplied by Reqt to create Compreatscore with dimensions c by 1.

FIG. 5 depicts an equation for determining number and severity of defects that have been fixed. In FIG. 5, PastdefectComp represents a matrix that maps past defects to components mapping. PastdefectComp has dimensions p by c. The dimension p represents the number of fixes at any time during a testing cycle. The number of fixes grows during a testing cycle but starts at zero initially and grows by one for each fix. The dimension c represents components, which are produced as part of architecting a system based upon the requirements. In FIG. 5, PastdefectComp is transposed, represented by T to create CompPastdefect with dimensions c by p. CompPastdefect is then multiplied by 1 with dimensions p by 1. 1 with dimensions p by 1 is a matrix of p rows and one column of the value 1. The multiplication creates Comppastdefectscore with dimensions c by 1.

In the example, program 200 then determines an overall component score based upon the component scores as related to the requirements and past defects as depicted in FIG. 6. In step 206, program 200 has not received any input yet based upon just fixed defects; therefore, the just fixed component score is left out of the equation in FIG. 6, which creates dimensions c by 2 instead of c by 3.

FIG. 6 depicts an equation for determining a components score based upon the previously determined Compreqtscore with dimensions c by 1 and Comppastdefectscore with dimensions c by 1. The result is Componentscores with dimensions c by 2.

In the example, program 200 weighs the determined values to create a weighted score for each test case as depicted in FIG. 7. In step 206, program 200 has not received any input based upon just fixed defects; therefore, dimensions represented by 3 are in fact represented by 2.

FIG. 7 depicts a first equation for determining TestcaseComp with dimensions t by c. TestcaseComp is created by multiplying TestcaseReqt with dimensions t by r and ReqtComp with dimensions r by c. As previously discussed, ReqtComp represents the mapping of requirements to components. TestcaseReqt represents a matrix that maps test cases to the requirements. Dimension t represents the number of test cases and r represents the number of requirements. The mapping is created by test planners during the creation of the test cases.

The second equation in FIG. 7 depicts Testcaserawscores with dimensions t by 2, which is equal to TestcaseComp with dimensions t by c multiplied by Componentscores with dimensions c by 2. TestcaseComp was solved in the first equation of FIG. 7, and Componentscores was solved in FIG. 6.

The third equation in FIG. 7 depicts Testcaseweightedscore with dimensions t by 1, which is equal to Testcaserawscores with dimensions t by 2 multiplied by Weightages with dimensions 2 by 1. Testcaserawscores was solved with the second equation of FIG. 7. Weightages are created by administrators of program 200, wherein administrators assign a score to component complexity and past defects. The assigned scores total 100 percent. The Testcaseweightedscore is determined for each test case and displayed as related to other test cases.

Program 200 receives additional data related to changed elements of one or more test cases (step 208). In various embodiments, program 200 receives additional data related to changed elements of one or more tests cases from a user of program 200 via a UI (e.g., UI 130) or a network (e.g., network 112). In an example, program 200 determines that a test case had the highest priority. A user of program 200 reviewed the highest priority test case and changed various elements. For example, an error exists because one requirement for a component of the test cases had code that needed to be changed. The user of program 200 changed the code and sent the updated test case with the fixed requirement back to program 200. In some embodiments, program 200 may assign the updated requirement a higher score, thereby raising the priority scores for all test cases that have the same requirement when a priority calculation is performed again. In another embodiment, the requirement has been thoroughly tested by a user of program 200, and program 200 assigns a low value for the requirement. In some embodiments, users of program 200 assign new values to the updated elements before program 200 receives the updated elements.

In some embodiments, if a component has changed, multiple test cases and requirement values may change because multiple requirements can make up a component, and multiple components can belong to a test case. In an example, new data is received by program 200 regarding a component, and program 200 assigns a higher value to the component score based upon the newly received data.

Program 200 determines priority scores for test cases based upon the received additional data (step 210). In some embodiments, program 200 may not receive additional data, and program 200 proceeds to decision step 212. In some embodiments, program 200 determines a new priority score for test cases based upon the elements of (step 206) and newly received data regarding elements of the test cases. In an example, program 200 utilizes the same scores from inputs A, B, and C but adds an additional input, D (new defects versus components mapping). Input D is based upon the newly received data pertaining to new defects. In an example, program 200 utilizes the newly assigned scores for each element (e.g., defect, component, or requirement) based upon the severity of the defect fixed but not yet tested. In another example, during each iteration of the operational steps of FIG. 2, the weighted score of each test case is revised based on the changing scores of the components that support the test cases.

In an embodiment, program 200 may determine priority scores for test cases by utilizing equations and matrixes that include additional information. In an example, program 200 utilizes the equations from FIGS. 3-5 to create values for components as related to requirements and past defects. Equations in FIGS. 3-5 employ the matrixes and matrix operations.

FIG. 3 depicts a set of equations for assigning a score for the complexity of each component based upon how important the requirements are that support the component. In FIG. 3, ReqtComp represents a matrix that maps requirements to components, which are produced as part of architecting a system. ReqtComp has dimensions r by c. The dimension r represents the number of requirements. The list of requirements is denoted by matrix Reqt having the dimensions r by 1. The dimension c represents the number of components, which are produced as part of architecting a system based upon the requirements. In FIG. 3, ReqtComp is transposed, represented by T to create CompReqt with dimensions c by r. CompReqt is then multiplied by Reqt to create Compreatscore with dimensions c by 1.

FIG. 4 depicts a set of equations for assigning a score to each component based on the number and severity of defects that have been fixed within the test case but not tested yet. In FIG. 5, JustfixeddefectComp represents a matrix that maps just fixed defects to components. JustfixeddefectComp has dimensions j by c. The dimension j represents the number of defects that have been fixed but not tested yet at any time during a testing cycle. The number of just fixed defects grows during a testing cycle but starts at one initially and grows by one for each new defect. The dimension c represents components, which are produced as part of architecting a system based upon the requirements. In FIG. 5, JustfixeddefectComp is transposed, represented by T to create Compjustfixeddefect with dimensions c by j. Compjustfixeddefect is then multiplied by 1 with dimensions j by 1. 1 with dimensions j by 1 is a matrix of j rows and one column of the value 1. The multiplication creates Compjustfixeddefectscore with dimensions c by 1.

FIG. 5 depicts a set of equations for assigning a score to each component based on the number and severity of defects that have been fixed within a testcase. In FIG. 5, PastdefectComp represents a matrix that maps past defects to components. PastdefectComp has dimensions p by c. The dimension p represents the number of defects that have been fixed and tested to have been fixed at any time during a testing cycle. The number of fixed defects grows during the life of a system. The number of fixed defects starts at some number at the beginning of a testing cycle and grows by one for each fixed defect. The dimension c represents components, which are produced as part of architecting a system based upon the requirements. In FIG. 5, PastdefectComp is transposed, represented by T to create CompPastdefect with dimensions c by p. CompPastdefect is then multiplied by 1 with dimensions p by 1. 1 with dimensions p by 1 is a matrix of p rows and one column of the value 1. The multiplication creates Comppastdefectscore with dimensions c by 1.

In the example, program 200 then assigns each component a set of three scores. FIG. 6 depicts an equation for assigning a set of three scores for each component based upon the previously determined Compreqtscore with dimensions c by 1, Compjustfixeddefectscore with dimensions c by 1, and Comppastdefectscore with dimensions c by 1. The result is Componentscores with dimensions c by 3.

In the example, program 200 weighs the determined values to create a weighted score for each test case as depicted in FIG. 7. FIG. 7 depicts a first equation for determining TestcaseComp with dimensions t by c. TestcaseComp is created by multiplying TestcaseReqt with dimensions t by r and ReqtComp with dimensions r by c. As previously discussed, ReqtComp represents the mapping of requirements to components. TestcaseReqt represents a matrix that maps test cases to the requirements. Dimension t represents the number of test cases and r represents the number of requirements. The mapping is created by test planners during the creation of the test cases.

The second equation in FIG. 7 depicts Testcaserawscores with dimensions t by 3, which is equal to TestcaseComp with dimensions t by c multiplied by Componentscores with dimensions c by 3. TestcaseComp was solved in the first equation of FIG. 7, and Componentscores was solved in FIG. 6.

The third equation in FIG. 7 depicts Testcaseweightedscore with dimensions t by 1, which is equal to Testcaserawscores with dimensions t by 3 multiplied by Weightages with dimensions 3 by 1. Testcaserawscores was solved with the second equation of FIG. 7. Weightages, also known as weighted scores, are created by administrators of program 200, wherein administrators assign a score to component complexity, just fixed defects, and past defects. The assigned scores total 100 percent. The Testcaseweightedscore will contain the final priority score for each test case.

In the example, when the user clicks a button called "Prioritize" in the user interface (UI) (e.g., UI 130), program 200 sorts the test cases based on the value in the Testcaseweightedscore matrix from the highest score down to lowest score. The list of the highest to lowest scores become the prioritized order in which the test cases should be executed. In other examples, depending upon the rules in the rules 142 in database 140, the sorting of the test cases may happen after a preset period of time has elapsed.

Program 200 determines whether additional data related to elements of one or more test cases are available (decision 212). In an example, program 200 may send out the priority results from (step 210) to all computing devices (e.g., computing device 104) that sent information to program 200. Program 200 may then wait for a preset amount of time (e.g., 24 hours) to receive additional data regarding the elements for the test cases previously prioritized. In another example, program 200 may have received new data during a calculation of test case prioritization.

If program 200 determines that additional data has been received (yes branch, decision 212), program 200 proceeds to step 208. In an example, program 200 determines that new information has been received. Program 200 then determines if the information contains any changes to elements utilized in the calculation of step 210, and program 200 assigns new values to the elements.

If program 200 determines that additional data has not been received (no branch, decision 212), program 200 proceeds to end. In an example, program 200 has exceeded the time limit for receiving new data; and therefore, stores the prioritization information for the test cases in database 140.

Figure 8:
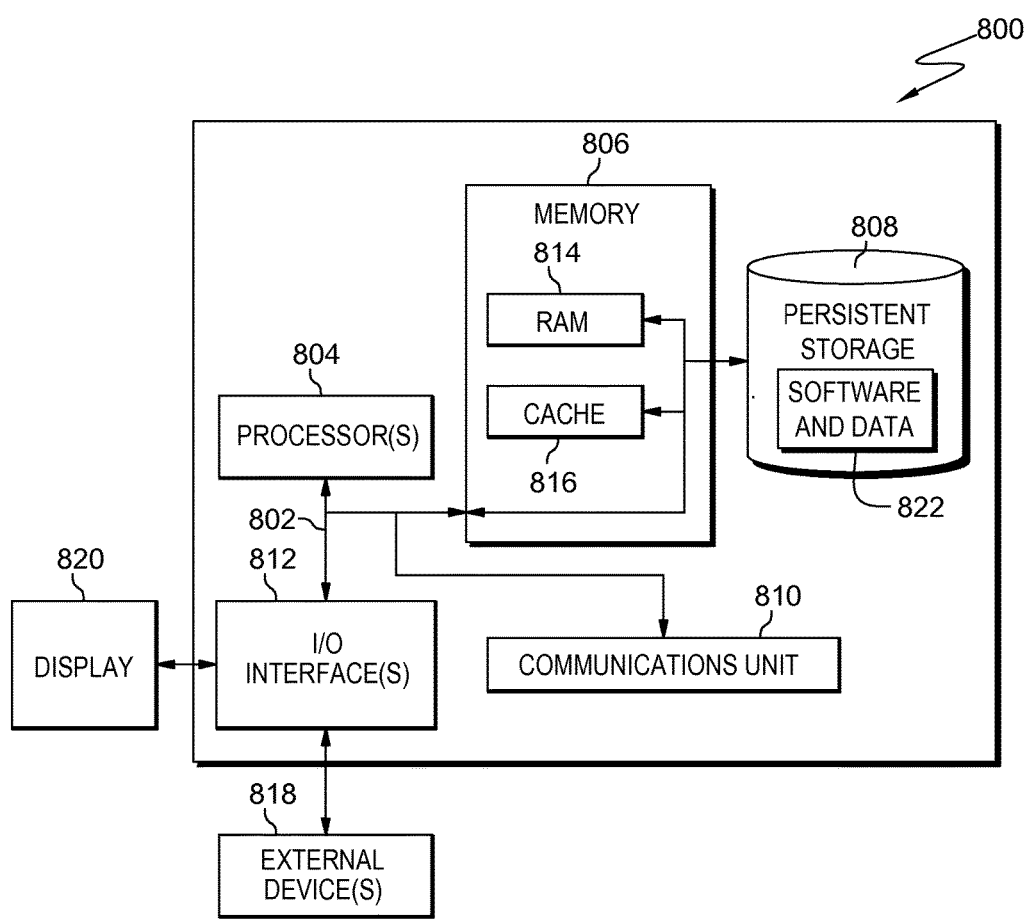
FIG. 8 depicts a block diagram of components of a computing device of FIG. 1, in accordance with an embodiment of the present invention.

FIG. 8 depicts a block diagram of components of computer 800, which is representative of computing device 102 and computing device 104, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computer 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications, and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory (RAM) 814 and cache memory 816. In general, memory 806 can include any suitable volatile or non-volatile computer readable storage media. Software and data 822 are stored in persistent storage 808 for access and/or execution by processor(s) 804 via one or more memories of memory 806. With respect to computing device 102, software and data 822 represents priority program 120 and database 140.

In this embodiment, persistent storage 808 includes a magnetic hard disk drive. Alternatively, or in addition to a magnetic hard disk drive, persistent storage 808 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Software and data 822 may be downloaded to persistent storage 808 through communications unit 810.

I/O interface(s) 812 allows for input and output of data with other devices that may be connected to computer 800. For example, I/O interface(s) 812 may provide a connection to external device(s) 818, such as a keyboard, a keypad, a touch screen, and/or some other suitable input device. External device(s) 818 can also include portable computer readable storage media such as, for example, thumb drives, portable optical or magnetic disks, and memory cards. Software and data 822 can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining priority information for test cases, the method comprising:
   identifying, by one or more computer processors, elements of a test case, wherein elements include architectural components that provide parameters of the test case;
   assigning, by one or more computer processors, a first score based upon a complexity due to requirements supported by a first component, wherein the complexity of the component is based on a number of requirements that make up the first component and a user rating of requirements that make up the first component for the first component;
   assigning, by one or more computer processors, a second score based upon a number of defects yet to be tested and corresponding ratings of severity for defects yet to be tested that have been fixed for a first component;
   assigning, by one or more computer processors, a third score based upon a number of past defects that have been tested and corresponding ratings of severity for past defect that have been tested and that have been fixed for a first component;
   generating, by one or more computer processors, a score for the first component based upon the assigned first, second, and third scores;
   determining, by one or more computer processors, a priority score for each of the one or more test cases based upon the assigned score for each component of the one or more identified elements, wherein the priority score is a representation of a severity of a failure for each one of the one or more tests case by a user; and
   executing, by one or more computer processors, a test case from one of the one or more test cases based on the priority score of the test case.

2. The method of claim 1, wherein assigning a score for each component of the one or more identified elements comprises:
   assigning, by one or more computer processors, a second score based upon a number of defects yet to be tested and corresponding ratings of severity for defects yet to be tested that have been fixed for a first component.

3. The method of claim 1, wherein assigning a score for each component of the one or more identified elements comprises:
   assigning, by one or more computer processors, a third score based upon a number of past defects that have been tested and corresponding ratings of severity for past defect that have been tested and that have been fixed for a first component.

4. The method of claim 1, further comprising: assigning, by one or more computer processors, a respective first score, second score, and third score to each component of the test case; and generating, by one or more computer processors, a respective score for each component based on the first score, second score, and third score.

5. The method of claim 1, wherein determining a priority score for each of the one or more test cases based upon the assigned score for each component of the one or more identified elements comprises:

identifying, by one or more computer processors, a weighted score for a test case based upon user input; and generating, by one or more computer processors, priority score for the test case based upon the assigned component scores and the weighted score.

6. A computer program product for determining priority information for test cases, the computer program product comprising:

one or more computer readable storage media and program instructions stored on the one or more computer readable storage media, the program instructions comprising:

program instructions to identify elements of a test case, wherein elements include architectural components that provide parameters of the test case;

program instructions to assign a score for each component of the one or more identified elements;

program instructions to determine a priority score for each of the one or more test cases based upon the assigned score for each component of the one or more identified elements, wherein the priority score is a representation of a measure of importance for each one of the one or more tests case by a user; and program instructions to execute a test case from one of the one or more test cases based on the priority score of the test case.

7. The computer program product of claim 6, wherein assigning a score for each component of the one or more identified elements comprises program instructions to:

assign a first score based upon a complexity of a first component, wherein the complexity of the component is based on a number of requirements that make up the first component and a user rating of requirements that make up the first component for the first component.

8. The computer program product of claim 6, wherein assigning a score for each component of the one or more identified elements comprises program instructions to:

assign a second score based upon a number of defects yet to be tested and corresponding ratings of severity for defects yet to be tested that have been fixed for a first component.

9. The computer program product of claim 6, wherein assigning a score for each component of the one or more identified elements comprises program instructions to:

assign a third score based upon a number of past defects that have been tested and corresponding ratings of severity for past defect that have been tested and that have been fixed for a first component.

10. The computer program product of claim 7, wherein assigning a score for each component of the one or more identified elements further comprises program instructions to:

assign a second score based upon a number of defects yet to be tested and corresponding ratings of severity for defects yet to be tested that have been fixed for a first component;

assign a third score based upon a number of past defects that have been tested and corresponding ratings of severity for past defect that have been tested and that have been fixed for a first component; and generate a score for the first component based upon the assigned first, second, and third scores.

11. The computer program product of claim 10, further comprising program instructions to:

assign a respective first score, second score, and third score to each component of the test case; and generate a respective score for each component based on the first score, second score, and third score.

12. The computer program product of claim 6, wherein determining a priority score for each of the one or more test cases based upon the assigned score for each component of the one or more identified elements comprises program instructions to:

identify a weighted score for a test case based upon user input; and generate priority score for the test case based upon the assigned component scores and the weighted score.

13. A computer system for determining priority information for test cases, the computer system comprising:

one or more computer processors;

one or more computer readable storage media;

program instructions stored on the computer readable storage media for execution by at least one of the one or more computer processors, the program instructions comprising:

program instructions to identify elements of a test case, wherein elements include architectural components that provide parameters of the test case;

program instructions to assign a score for each component of the one or more identified elements;

program instructions to determine a priority score for each of the one or more test cases based upon the assigned score for each component of the one or more identified elements, wherein the priority score is a representation of a measure of importance for each one of the one or more tests case by a user; and program instructions to execute a test case from one of the one or more test cases based on the priority score of the test case.

14. The computer system of claim 13, wherein assigning a score for each component of the one or more identified elements comprises program instructions to:

assign a first score based upon a complexity of a first component, wherein the complexity of the component is based on a number of requirements that make up the first component and a user rating of requirements that make up the first component for the first component.

15. The computer system of claim 13, wherein assigning a score for each component of the one or more identified elements comprises program instructions to:

assign a second score based upon a number of defects yet to be tested and corresponding ratings of severity for defects yet to be tested that have been fixed for a first component.

16. The computer system of claim 13, wherein assigning a score for each component of the one or more identified elements comprises program instructions to:

assign a third score based upon a number of past defects that have been tested and corresponding ratings of severity for past defect that have been tested and that have been fixed for a first component.

17. The computer system of claim 14, wherein assigning a score for each component of the one or more identified elements further comprises program instructions to:

assign a second score based upon a number of defects yet to be tested and corresponding ratings of severity for defects yet to be tested that have been fixed for a first component;

assign a third score based upon a number of past defects that have been tested and corresponding ratings of severity for past defect that have been tested and that have been fixed for a first component; and generate a score for the first component based upon the assigned first, second, and third scores.

18. The computer system of claim 17, further comprising program instructions to:
assign a respective first score, second score, and third score to each component of the test case; and
generate a respective score for each component based on the first score, second score, and third score.

* * * * *